Nov. 5, 1935. A. D. EITZEN Re. 19,746
QUOTATION PROJECTING OR SIMILAR APPARATUS
Original Filed March 10, 1930 2 Sheets-Sheet 1
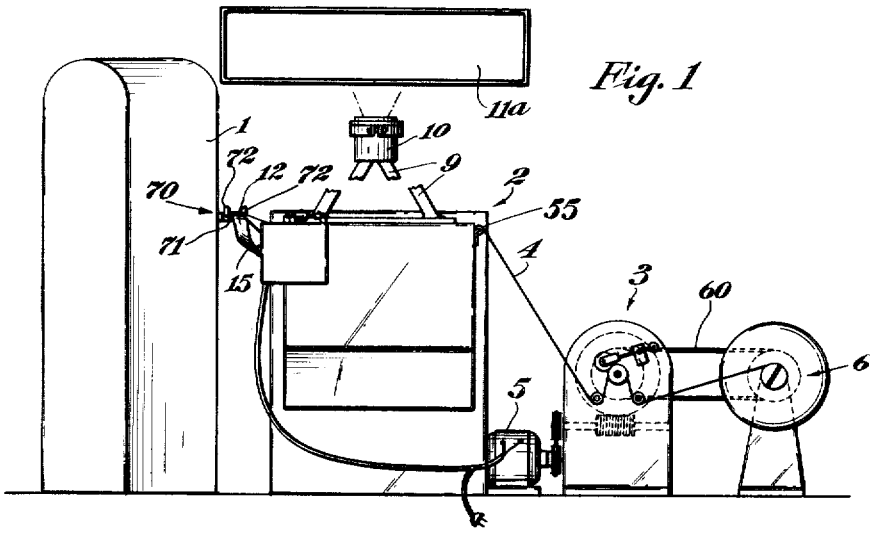
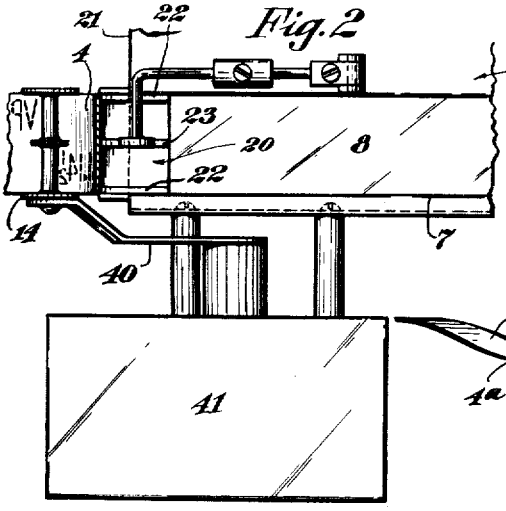
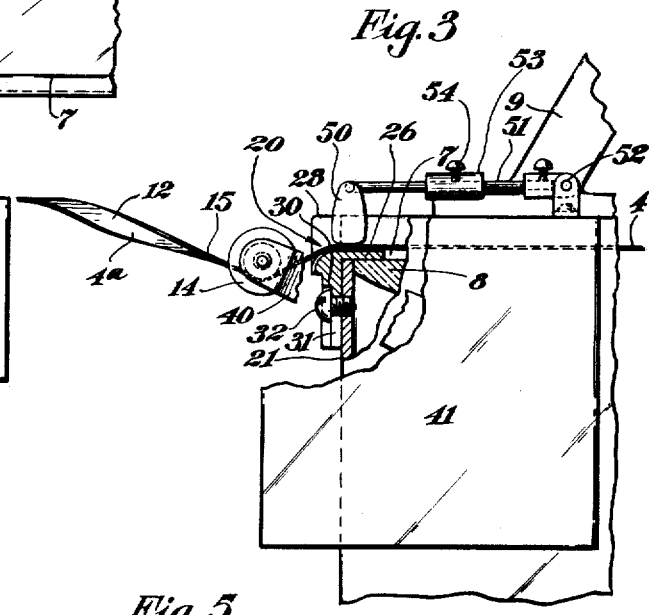
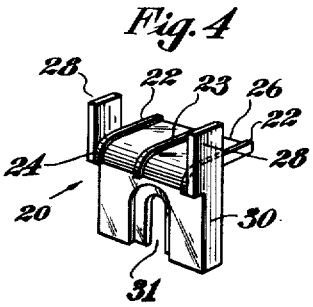
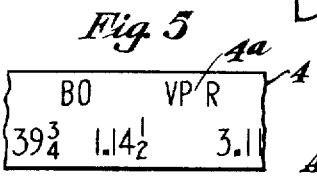
INVENTOR
August D. Eitzen,
BY
Gustav Drews,
ATTORNEY QUOTATION PROJECTING OR SIMILAR APPARATUS
Original Filed March 10, 1930 2 Sheets-Sheet 2
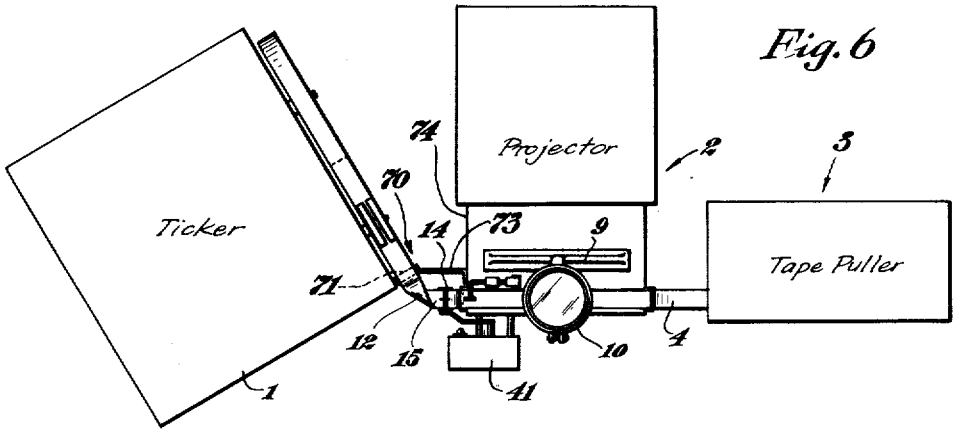
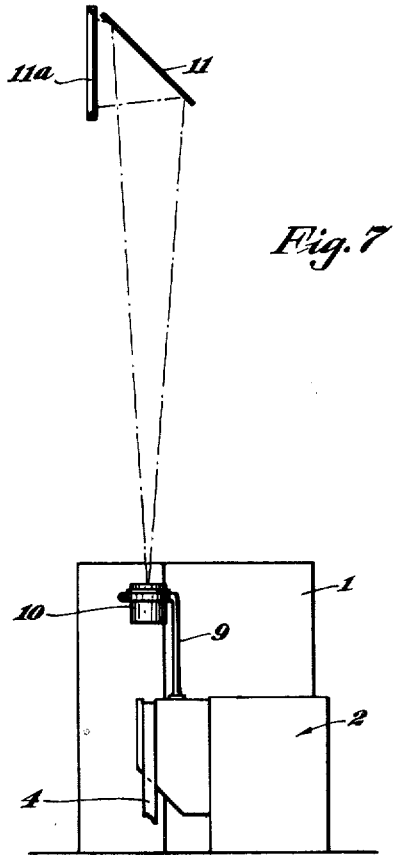
INVENTOR
August D. Eitzen,
BY Gustav Drews
ATTORNEY Reissued Nov. 5, 1935 Re. 19,746

UNITED STATES PATENT OFFICE 19,746

QUOTATION PROJECTING OR SIMILAR APPARATUS

August D. Eitzen, Rockville Centre, N. Y., assignor to News Projection Corporation, New York, N. Y., a corporation of New York Original No. 1,908,832, dated May 16, 1933, Serial No. 434,538, March 10, 1930. Application for reissue August 26, 1933, Serial No. 686,980

21 Claims. (Cl. 88—24)

The invention relates to stock quotation projecting or similar apparatus in which the image of a printed strip or tape is thrown upon a screen, and its principal objects are to provide a new and improved means for or method of conducting the tape from the ticker to the projector, with correspondingly constructed or arranged and simplified projecting means, and an improved structure or guide to cooperate with the tape passing through the projector in the present manner.

In accordance with the invention the ticker is preferably located in an angular position in relation to the projector and the tape is caused to make a half turn or twist in its passage from the ticker to the projector thus bringing the printed face of the strip downward and the tape passes through the projector in this position; to avoid blurring the freshly printed characters, I provide a new and improved guide at or adjacent the point where the tape enters the projector, the guide being so constructed and arranged that its tape engaging surfaces are in contact only with unprinted strips thereof. By turning the tape in this manner and passing it through the projector in reversed position, I am enabled to use a simplified projector arrangement including only one mirror between the projecting lens or group of lenses and the screen, since the characters initially reversed by reversal of the tape are reversed by the projecting lens (or objective) bringing them into proper position on the screen when reflected by a single mirror properly placed in relation to the objective and the screen. The loop to control the puller, which draws the tape through the projector, is formed in the portion of the tape between the ticker and the projector, and the roll or equivalent element which runs on the tape and controls the contact which in turn controls the action of the puller, runs on the upper, unprinted surface of the tape, after turning but adjacent to the twisted formation.

These and other features, capabilities and advantages of the invention will appear from the subjoined detail description of one embodiment thereof, illustrated in the accompanying drawings in which Fig. 1 is an elevation of apparatus embodying the invention in one form, the showing being to a certain extent diagrammatic.

Fig. 2 is a top plan of a part of the projector showing the contact controlling roll and tape guide.

Fig. 3 is a longitudinal section in a central plane of the contact roll, guide and light aperture of the projector.

Fig. 4 is a perspective view of the guide.

Fig. 5 shows a portion of the printed tape.

Fig. 6 is a top plan of Fig. 1, omitting the screen, and representing the tape puller and rewind mechanism diagrammatically.

Fig. 7 is a right side elevation of Fig. 6.

In Fig. 1, 1 is a ticker, preferably arranged at a diagonal angle to the projector 2. The tape puller 3 pulls the tape 4 through the projector, and is driven by electric motor 5. Rewinding apparatus 6 is also shown. The projector has a light aperture 7. A suitable condensing lens 8 is shown below the aperture in Fig. 3. Above the aperture a bracket 9 supports a casing 10 containing the projecting lenses (or objective), and a mirror 11 above the projecting lens is arranged at a proper angle to throw the light beam on a translucent screen 11*a* and of course the location of the screen may be varied and the mirror position or angle changed accordingly.

The ticker is arranged at such a diagonal angle and at such a moderate distance from the projector, substantially as shown in Figs. 1 and 6, that the tape may be turned laterally through one-half a revolution as indicated by the twisted portion 12, constituting a twisted tape loop, Figs. 1 and 3, thus bringing the printed face 4*a*, which is upward as the tape issues from the ticker, to downward position; and the tape passes through the projector, and over the light aperture 7 in this position. A roll 14 connected to operate a suitable switch in the circuit of motor 5, or other circuit to control the puller, runs on the upper (unprinted) portion of the tape between the turn or twist 12 and the projector, forming the loop 15 to control the puller action. The loop formed by the loop portions 12 and 15 will obviously change in configuration and depth and the movement of the tape by the puller will thus be controlled and respond to the change in configuration and change in depth of this composite loop or portions thereof.

In the type of controlling mechanism shown, the roll 14 is carried by an arm 40, connected to a suitable switch in a switch box 41 supported on one side of the projector.

Evidently by the described arrangement, it is unnecessary to provide any helical guide or the like such as heretofore used, between the ticker and the contact switch controlled finger 14; and that by proper positioning of the ticker and forming a twist in a free or unsupported portion of the tape between the ticker and the switch controlling finger, I dispense with such helical or other guides, except possibly, under some circumstances, a lateral guide 70 such as illustrated in Figs. 1 and 6. In the present instance, this guide 70 consists of a supporting ledge 71, having prongs 72 extending along the sides thereof, and formed at the end of an arm 73 secured to the angle box 74 of the projector 2. The guide 70 prevents lateral displacement of the tape 4 when the ticker is disposed at substantially an angle of 45° to the path of movement of the tape through the projector 2, and when the tape 4 forms a twist to cause the inked surface, which faces upwardly when leaving the ticker, to face downwardly when passing through the projector 2.

A short distance beyond the contact controlling roll 14 the tape passes over a guide 20 supported on the side wall 21 of the angle box 74. This improved guide is constructed to avoid contact of any of its surfaces with printed surfaces of the tape. Thus, as best shown in Figs. 2 and 4, the portion of the guide adjacent the tape is formed with side ribs 22 and a central rib 23, these ribs having narrow, flat upper surfaces, which alone engage the lower surface of the tape and are located in positions corresponding to unprinted marginal strips of the tape and the central strip between the upper and lower characters thereon, as sufficiently indicated in Fig. 5. The forward ends of all the ribs are curved downward as at 24, thus providing for free sliding of the tape over the forward ends of the ribs in all of its various positions as determined by the depth of the loop and position of the contact controlling roll 14. The straight, horizontal portions of the ribs 22, 23 are formed on an upper horizontal plate portion 26 of the guide, which may overlie the upper edge of the side wall 21 and the adjacent portion of the condensing lens 8. Near the forward end of the guide it has side flanges 28 projecting upwardly above the ribs to guide the tape laterally by engagement with its edges. The guide also has a front vertical plate portion 30, provided with a slot 31 to receive a screw 32 by which the guide is easily placed and held in position.

A tape guide roll 55 is, in a preferred arrangement, placed adjacent the posterior end of the light aperture 7, as sufficiently shown in Fig. 1, to properly guide the tape, in cooperation with guide 20, over the light aperture and condenser 8 and without contacting with the condenser. The use of such a roll 55 permits the free passage of the tape, which might cause trouble, as by sticking or adhering to an ordinary stationary guide at this point. In other words, the roll 55 acts as a stripper for the tape when the tape puller resumes its operation, if the tape should have adhered to the roll 55 during the preceding period of rest. The guide roll may in some cases have a plain cylindrical surface engaging the tape; otherwise it may have annular flange or rib formation corresponding substantially to the locations of the ribs 22 and 23 of the stationary guide 20, thus preventing any contact of the guide roll 55 with printed portions of the tape.

It is important to insure smooth running of the tape over the light aperture in the projector, without jerking, in order to secure smooth and even projection of the image on the screen, avoid undesired oscillation of the loop follower 14 or switch controlled thereby, or other difficulties caused by jerking of the tape, as well understood by skilled persons. For this purpose, in addition to the accurate control of the tape puller by means before mentioned, I preferably provide a retarding device such as friction member 50, the flat lower face of which runs on the tape in a position corresponding to the center rib 23 of guide 20. This friction member is carried by an arm 51 pivotally mounted at 52, and desired pressure may be applied by a spring, or by a weight 53 slidably mounted on the arm so that the friction pressure may be varied as desired. This weight is secured in adjusted position, as by a set screw 54. The pressure member 50 applies sufficient frictional resistance to the tape at the guide to insure the proper tensioning and smooth movement of the tape across the light aperture and to the puller 3.

The rewind reel 6, Fig. 1, is yieldably or frictionally driven from the puller or a part of the puller driving gearing, as by a belt 60 which may slip on the drive pulley as the diameter of the tape increases during rewinding on the reel 6.

It is obvious that various changes and modifications may be made in the details of construction and in the improved method without departing from the general spirit of the invention set forth in the appended claims.

I claim:

1. Projection apparatus of the class described comprising a ticker discharging tape with its printed side facing upwardly, a projector having a light aperture, and a tape puller, the tape running from the ticker through the projector over the aperture to the puller, the tape having therein an axial half twist between the ticker and the projector bringing the printed face of the tape downward as it passes the light aperture, and a confining guide at the entrance end of the light aperture to maintain the twist in the tape.

2. Projection apparatus of the class described comprising a ticker discharging tape with its printed side facing upwardly, a projector having a light aperture, and a tape puller, the tape running from the ticker through the projector over the aperture to the puller, the tape having therein an axial half twist between the ticker and the projector bringing the printed face of the tape downward as it passes the light aperture, and a confining guide at the entrance end of the light aperture to maintain the twist in the tape, a condensing lens below the tape adjacent the aperture, a projecting lens group above the tape and aperture, and a mirror in angular relation to the light beam from the projecting lens to throw the tape image on a screen.

3. Projection apparatus of the class described comprising a ticker discharging tape with its printed side facing upwardly, a projector having a light aperture, and a tape puller, the tape running from the ticker through the projector over the aperture to the puller, the tape having therein an axial half twist between the ticker and the projector bringing the printed face of the tape downward as it passes the light aperture, a confining guide at the entrance end of the light aperture to maintain the twist in the tape, the tape portion between the ticker and the projector being also arranged to provide a controlling loop, and an element running on the loop and controlling the tape puller.

4. Projection apparatus of the class described comprising a ticker discharging tape with its printed side facing upwardly, a projector having a light aperture, and a tape puller, the tape running from the ticker through the projector over the aperture to the puller, the tape having therein an axial half twist between the ticker and the projector bringing the printed face of the tape downward as it passes the light aperture, a confining guide at the entrance end of the light aperture to maintain the twist in the tape, the tape portion between the ticker and the projector being also arranged to provide a controlling loop, and an element running on the upper, unprinted tape surface beyond the twisted portion of the tape.

5. Projection apparatus of the class described comprising a ticker discharging tape with its printed side facing upwardly, a projector having a light aperture, and a tape puller, the tape running from the ticker through the projector over the aperture to the puller, the tape having therein an axial half twist between the ticker and the projector bringing the printed face of the tape downward as it passes the light aperture, a confining guide at the entrance end of the light aperture to maintain the twist in the tape, the tape portion between the ticker and the projector being also arranged to provide a controlling loop, an element running on the loop and controlling the tape puller, and a tape guide on the projector adjacent the tape-puller-controlling element.

6. Projection apparatus of the class described comprising a ticker discharging tape with its printed side facing upwardly, a projector having a light aperture, and a tape puller, the tape running from the ticker through the projector over the aperture to the puller, the tape having therein a rotary half twist between the ticker and the projector bringing the printed face of the tape downward as it passes the light aperture, the tape portion between the ticker and the projector being also arranged to provide a controlling loop, an element running on the loop and controlling the tape puller, and a confining tape guide on the projector adjacent to and cooperating with, the tape-puller-controlling element to maintain the twist in the tape, the guide including raised longitudinal surfaces corresponding to the unprinted strips of the tape surface, the printed longitudinal areas of the tape running between the raised surfaces and free from contact with the guide.

7. Projection apparatus of the class described comprising a ticker discharging tape with its printed side facing upwardly, a projector having a light aperture, and a tape puller, the tape running from the ticker through the projector over the aperture to the puller, the tape having therein a rotary half twist between the ticker and the projector bringing the printed face of the tape downward as it passes the light aperture, the tape portion between the ticker and the projector being also arranged to provide a controlling loop, an element running on the loop and controlling the tape puller, and a confining tape guide on the projector adjacent to and cooperating with, the tape-puller-controlling element to maintain the twist in the tape, the guide including raised longitudinal surfaces corresponding to unprinted strips of the tape surface, the printed longitudinal areas of the tape running between the raised surfaces and free from contact with the guide, the guide also having side flanges for lateral guiding of the tape.

8. In combination with a ticker, a projector having light aperture and tape having an axial twist between the ticker and projector to invert the printed side of the tape, a tape guide adjacent the projector and including an upper portion having raised longitudinal ribs corresponding to unprinted strips of the tape surface, and a pressure device for maintaining the tape in engagement with said guide in its inverted position, the tape passing across the light aperture with the printed side facing downwardly and in engagement with said ribs.

9. In combination with a ticker, a projector having a light aperture and tape having an axial twist between the ticker and projector to invert the printed side of the tape, a tape guide adjacent the projector and including an upper portion having raised longitudinal ribs corresponding to unprinted strips of the tape surface, the guide also having side flanges for tape edge guiding, and a pressure device for maintaining the tape in engagement with said guide in its inverted position, the tape passing across the light aperture with the printed side facing downwardly and in engagement with said ribs.

10. In combination with a ticker, a projector having a light aperture and tape having an axial twist between the ticker and projector to invert the printed side of the tape, a guide on the projector and including an upper portion having raised longitudinal ribs corresponding to unprinted strips of the tape surface, and a pressure device for maintaining the tape in engagement with said guide in its inverted position, the tape passing across the light aperture with the printed side facing downwardly and in engagement with said ribs.

11. In combination with a ticker, a projector having a light aperture and tape having a loop portion between the ticker and projector, a guide on the projector and including an upper portion having raised longitudinal ribs corresponding to unprinted strips of the tape surface, the tape being rotarily twisted between the ticker and projector and directed over the guide with its printed face downward, and a lever for pressing the tape against said guide and thus maintaining it in its twisted relation to said ticker.

12. In combination with a ticker, a projector having a light aperture and tape having an axial twist between the ticker and projector to invert the printed side of the tape, a tape guide on the projector and including an upper portion having raised longitudinal side and central ribs for tape support in positions corresponding to the unprinted margins and central strip of the tape, and a pressure device for maintaining the tape in engagement with said guide in its inverted position, the printed side of the tape facing downwardly and engaging said ribs when passing to the light aperture.

13. In combination with a ticker, a projector having a light aperture and tape having an axial twist between the ticker and projector to invert the printed side of the tape, a tape guide on the projector and including an upper portion having raised longitudinal side and central ribs for tape support in positions corresponding to the unprinted margins and central strip of the tape, the guide also having side flanges for tape edge guiding, and a pressure device for maintaining the tape in engagement with said guide in its inverted position, the printed side of the tape facing downwardly and engaging said ribs when passing to the light aperture.

14. In combination with a ticker, a projector having a light aperture and tape having an axial twist between the ticker and projector to invert the printed side of the tape, a tape guide on the projector and including an upper portion having raised longitudinal side and central ribs for tape support in positions corresponding to the unprinted margins and central strip of the tape, the guide also having side flanges for tape edge guiding, the guide having means for adjustable mounting on the projector, and a pressure device for maintaining the tape in engagement with said guide in its inverted position, the printed side of the tape facing downwardly and engaging said ribs when passing to the light aperture.

15. In combination with a ticker, a projector having a light aperture and tape having an axial twist between the ticker and projector to invert the printed side of the tape, a tape guide on the projector and including an upper portion having raised longitudinal ribs corresponding to unprinted strips of the tape surface, the said upper portion of the guide being arranged to overlap a condensing lens in position in the projector, and a pressure device for maintaining the tape in engagement with said guide in its inverted position, the printed side of the tape facing downwardly and engaging said ribs when passing to the light aperture.

16. In combination with a ticker, a projector having a light aperture and tape having an axial twist between the ticker and projector to invert the printed side of the tape, a tape guide adjacent the projector and including an upper portion having raised longitudinal ribs corresponding to unprinted strips of the tape surface, and a pressure device for maintaining the tape in engagement with said guide in its inverted position, the printed side of the tape facing downwardly when crossing the light aperture and engaging the ribs of said guide when passing thereto, the forward edge portion of the guide and ribs being curved downward to receive the tape running in different angular directions in accordance with variations in length of its loop portion, the loop in the tape being disposed adjacent said forward edge portion and guided thereby.

17. Projection apparatus of the class described, comprising a ticker, a projector having a light aperture, a tape puller and a tape running from the ticker through the projector over the aperture to the puller, the tape having therein an axial half twist between the ticker and the projector bringing the printed face of the tape downward as it passes the light aperture, a guide including a lever for maintaining the tape in its twisted relation to said ticker at the entrance end to said light aperture and a follower running on the tape beyond the twist therein and adjacent the projector and guide and connected to a contact in the control circuit of the tape puller.

18. The combination defined in claim 8 with the addition of a frictional tape retarding device applied to the tape in cooperation with one of said tape guide ribs.

19. Projection apparatus of the class described comprising a ticker discharging tape with printed matter on one face thereof, a projector having a light aperture, and a tape puller, the tape running from the ticker through the projector over the aperture to the puller, the tape having therein axial twist between the ticker and the aperture to invert the printed face of the tape as it passes the light aperture, and a guide between the ticker and the light aperture to maintain the twist in the tape.

20. In a projection system wherein a character-bearing tape passes from ticker mechanism flatwise and with one surface facing upwardly, the method which comprises supporting said tape for movement through a projection field with said one surface facing downwardly, forming a loop between said ticker mechanism and the projection field whereby a twisted tape loop is disposed adjacent the entrance to said projection field, and controlling movement of said tape through said projection field in response to change in configuration of said tape loop.

21. In combination, ticker mechanism from which a character-bearing tape passes flatwise and with one surface facing upwardly, means for supporting the tape in a projection field with said one surface facing downwardly, means for pulling the tape through said projection field, there being a twisted tape loop between said projection field and said ticker mechanism which changes in configuration when said tape-pulling means operates non-synchronously with respect to said ticker mechanism, the twist in said tape loop being formed due to the different facing relations of sections of said tape, and means for varying the operation of said tape-pulling means in response to change in configuration of said tape loop.

AUGUST D. EITZEN.